Feb. 11, 1969  G. ZAKIM ET AL  3,427,178
METHOD FOR COATING A MOLD WITH A POLYURETHANE RELEASE AGENT
Filed July 15, 1964
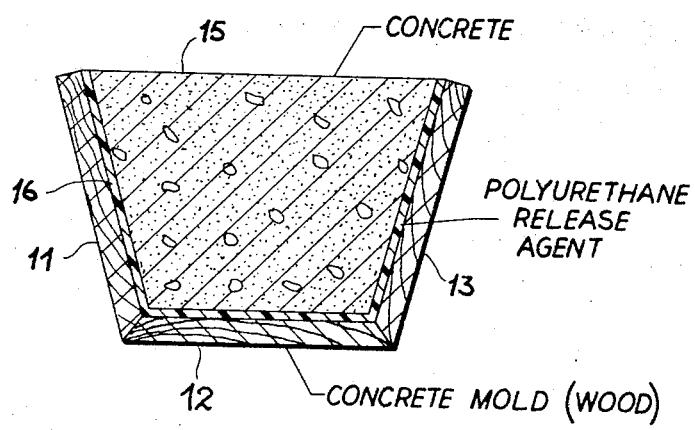
MUSA M. SHIHADEH
GERALD ZAKIM
INVENTORS.
BY
Karl G. Ross
AGENT United States Patent Office 3,427,178
Patented Feb. 11, 1969

3,427,178
METHOD FOR COATING A MOLD WITH A POLY-URETHANE RELEASE AGENT
Gerald Zakim, Clifton, and Musa M. Shihadeh, Paterson, N.J., assignors to Latex and Polymer Research Corporation, Paterson, N.J., a corporation of New York
Filed July 15, 1964, Ser. No. 382,972
U.S. Cl. 117—5.1  1 Claim
Int. Cl. B44d 1/20, 1/48

ABSTRACT OF THE DISCLOSURE

A method of preparing a mold for concrete, synthetic resin and the like, wherein the mold is coated with a polyurethane in a partially cured state which is thereafter subjected to final curing in situ on the mold in the presence of ambient moisture.

---

Our present invention relates to improved methods of preparing molds for the shaping of material in a plastic state and, more particularly, to molds coated with a release agent as well as a method of producing such an agent and the agent made by this method.

It is a common practice in the molding art to provide a mold whose shaping surfaces are coated with a release or parting agent to permit removal of the shaped article from the mold and/or dismantling of the latter without adversely affecting the surface of the article cast in the mold. In the construction trades, therefore, it is common to provide the concrete contacting surfaces of foundation forms, falsework and other concrete molds with waxy or oily layers adapted to prevent adhesion of the concrete to the mold. Similarly, release or parting layers for the prevention of adhesion of the material to be shaped to the mold surface is provided in injection-molding apparatus and for casting molds for the shaping of synthetic resins, plaster or the like. It has long been a requirement in such molding fields that a release agent be developed which is effective even after repeated molding operations.

It is an object of the present invention to provide an improved release agent for preventing the adhesion of a material to be plastically shaped to a mold of this character.

Another object of this invention is to provide a method of preparing a mold for the shaping of plastic materials.

Yet another object is to provide a mold employing the improved release agent.

Still another object of this invention is to provide a method of making the release agent.

We have discovered, in accordance with the present invention, that a suitable release agent for the relatively low-temperature shaping of plastic masses in molds is a polyurethane preferably cured in situ on the shaping surfaces of the molds. The term "mold" as used herein is intended to encompass all forms of shaping members wherein the material to be shaped can be introduced by pouring or injection with or without the aid of pressure. The novel release agent has been found to be particularly suitable for the casting of materials adapted to set with time (e.g. structural concrete, dental plaster) by combination with ambient substances or by internal chemical reaction, polymerizable material, substances settable upon evaporation of solvents incapable of adversely affecting the polyurethane layer, thermoplastic and like substances which harden upon cooling, and even some thermosetting substances which do not require elevated setting temperatures.

According to another feature of our invention, the polyurethane release agent, which preferably has a coating thickness on the order of a fraction of a millimeter on the shaping surfaces of the mold, is the reaction product of a di-isocyanate and a polyhydroxyl compound and is applied in the form of a solution in a volatile solvent. Advantageously, the polyurethane is partially cured prior to application to the mold surfaces, with complete curing being carried out in situ. The polyhydroxyl compounds can be polyesters, polyethers and polyols although other polyhydroxyl compounds are suitable as long as the number of reactive isocyanate groups is in excess of the number of hydroxyl groups. The polyurethane is diluted to a brushable or sprayable consistency (e.g. on the order of 20 to 1000 cps. viscosity) with an anhydrous aromatic or oxygen-containing aliphatic solvent. Suitable aliphatic solvents include ketones and esters. The polyurethane produced as described above is moisture-curable and sets in the presence of ambient moisture on the mold surfaces into a release agent tenaciously adherent to these surfaces but permitting ready separation of the shaped body from the mold. The mold can be composed of wood, synthetic resin, ceramic, glass or metal, as required.

The above and other objects, features and advantages of the present invention will become more readily apparent from the following description, reference being made to the appended drawing, the sole figure of which is a cross-sectional view through a mold provided with a coating of a release agent according to the invention, and the following example indicating a preferred method of carrying out the present invention.

In the drawing we show a concrete mold whose form boards 11, 12 and 13 are joined in the usual manner to form a trough 14 for a plastic mass of concrete 15. The shaping surfaces of boards 11–13 are coated with a polyurethane release agent 16 as will be described hereinafter.

Example

The release agent 16 is prepared by mixing 100 parts by weight of toluene diisocyanate with 25 parts by weight of 1,4-butanediol and 10 parts by weight of glycerol (as polyhydric compounds) in the presence of 1 part by weight of a polymerization catalyst (dibutyl-tin-dilaurate) in 200 parts by weight of a vaporizable solvent. Both monoethyl-ethyleneglycol-ether acetate and monobutyl-ethyleneglycol-ether acetate were found to be suitable as solvents. The solution was heated to 135° C. for about one half hour to partially cure the polyurethane and then cooled in the absence of oxygen (under nitrogen atmosphere) whereupon another 200 parts by weight of the solvent was added to bring the solution to a viscosity between 200 and 1000 cps. The solution was then packaged and maintained under nitrogen atmosphere for a prolonged shelf life. The solution was applied to the mold 10 by brushing onto the shaping surfaces and permitted to cure in the presence of ambient moisture. The resulting mold was suitable for 15–20 castings in the course of which a concrete cure time of 1–3 days was employed; another application of the polyurethane release agent was then required. The coating thickness was about 1 mil.

Repeated castings were also obtained when the mold-release agent was applied to a plaster mold for the casting of dental plates from synthetic resin to metal molds for the low-temperature (below about 100° C.) injection molding of synthetic resins, and to a ceramic mold for the shaping of plaster.

The invention described and illustrated is believed to admit of many modifications within the ability of persons skilled in the art, all such modifications being included within the spirit and scope of the appended claim.

We claim:
1. A method of preparing a mold for the shaping of material in a plastic state, comprising the steps of producing a release agent by reacting about 100 parts by weight of toluene diisocyanate with about 25 parts by weight 1,4-butanediol and 10 parts by weight of glycerol in the presence of about 1 part by weight of dibutyl-tindilaurate to produce a moisture-curable polyurethane; partially curing said polyurethane in the absence of gaseous oxygen by heating said polyurethane to a temperature of about 135° C. in about 200 parts by weight of an anhydrous solvent, said solvent being selected from the group which consists of monoethyl and monobutyl ethyleneglycol ether acetates; adding an additional quantity of said anhydrous solvent to the partially cured polyurethane to produce a solution of said polyurethane having a viscosity on the order of 20 to 1000 cps.; applying said solution to at least the shaping surfaces of said mold without pretreatment thereof to produce a coating having a thickness on the order of a fraction of a millimeter; and exposing the mold surfaces coated with said solution to air for a period and at a temperature sufficient to effect evaporation of said solvent and complete curing of said polyurethane by ambient moisture.

References Cited

UNITED STATES PATENTS

| | | | |
|---|---|---|---|
| Re. 20,693 | 4/1938 | Kisselle | 249—115 |
| 3,135,711 | 6/1964 | Thoma et al. | 117—161 X |
| 3,218,215 | 11/1965 | Achterhof et al. | 117—161 |
| 3,240,618 | 3/1966 | Hemming | 117—5.1 |
| 3,264,089 | 8/1966 | Hansen | 117—161 |
| 3,267,077 | 8/1966 | Windemuth et al. | 117—161 |
| 3,274,026 | 9/1966 | Nyquist | 117—21 X |
| 2,266,353 | 12/1941 | Carney | 249—115 |
| 342,900 | 4/1943 | Fickert et al. | 18—47 |
| 1,662,365 | 3/1928 | Comstock | 117—5.3 |
| 2,903,375 | 9/1959 | Peras | 117—5.3 |
| 829,377 | 8/1906 | Bartlett | 249—115 |
| 1,334,029 | 3/1920 | Hackman | 249—115 |
| 3,029,210 | 4/1962 | Groszos | 260—29.1 |
| 3,056,756 | 2/1962 | Hall | 260—29.1 |
| 2,494,329 | 1/1950 | Carlin | 18—47 XR |
| 2,648,099 | 8/1953 | Dunmire | 18—47 XR |
| 2,624,916 | 1/1953 | Persals | 18—47 XR |
| 3,016,719 | 1/1962 | Reindl | 249—115 |

FOREIGN PATENTS

| | | | |
|---|---|---|---|
| 232,542 | 10/1958 | Australia | 117—161 |
| 251,210 | 9/1960 | Australia | 117—161 |

WILLIAM D. MARTIN, *Primary Examiner.*

P. ATTAGUILE, *Assistant Examiner.*

U.S. Cl. X.R.

117—148, 161